Jan. 22, 1952    P. SPENCE    2,583,236
TEMPERATURE CONTROL DEVICE
Filed Sept. 3, 1947
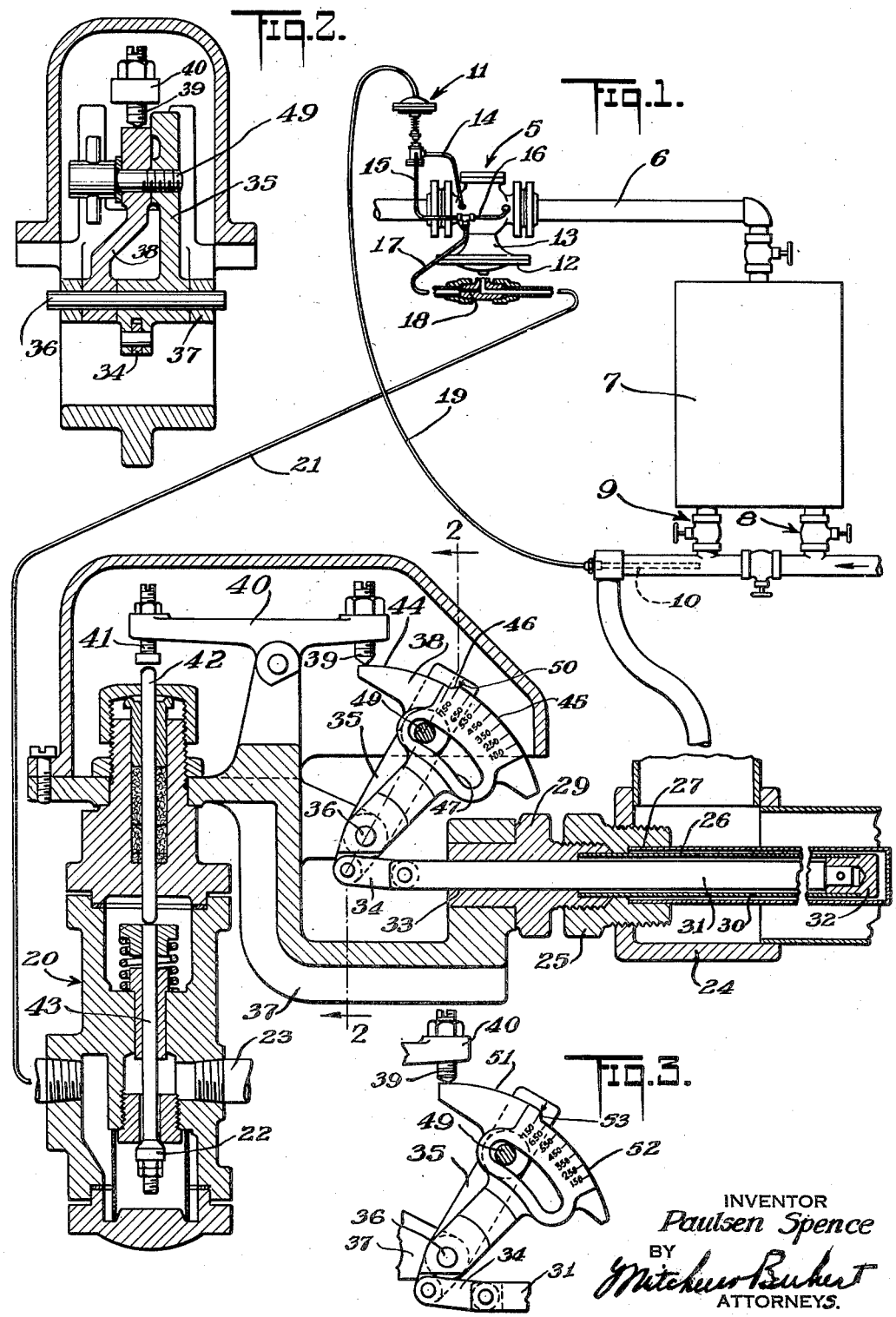
INVENTOR
*Paulsen Spence*
BY
ATTORNEYS.

Patented Jan. 22, 1952

2,583,236

UNITED STATES PATENT OFFICE 2,583,236

TEMPERATURE CONTROL DEVICE

Paulsen Spence, Baton Rouge, La., assignor to Spence Engineering Company, Inc., Walden, N. Y., a corporation of New York Application September 3, 1947, Serial No. 771,841

1 Claim. (Cl. 236—87)

My invention relates to a temperature regulator and in one of its more specific aspects relates to a safety device for preventing an oversupply of heating medium to a heater or the like. The invention represents an improvement over features of my Patent No. 2,469,057, issued May 3, 1949.

It is an object of my invention to provide an improved device of the character indicated.

It is another object to provide an improved safety device for a heater, wherein a relatively wide range of safety temperatures may be selected with ease and accuracy.

Other objects and various further features of the invention will be pointed out or will occur to those skilled in the art from a reading of the following specification in connection with the accompanying drawings. In said drawings:

Fig. 1 is a more or less diagrammatic representation of a heater equipped with apparatus illustrative of the invention, parts being shown in section and other parts being broken away;

Fig. 2 is a sectional view taken substantially in the plane 2—2 of Fig. 1; and

Fig. 3 is a fragmentary detail illustrating a modified form of the invention.

Briefly stated, my invention contemplates an improved mechanism for assuring the shutdown of heating fluid being supplied, say, to the heater, the said mechanism to be effective upon the failure or improper functioning of the means normally employed for a given regulation of said medium. The invention will be described as embodied in a hot water heater, but the principles of the invention are of broader application since the invention and various features thereof may be used in connection with other apparatus.

Referring to Figs. 1 and 2 of the drawings, my invention is shown in application to a main valve 5 for controlling the supply of heating medium through a pipe 6 to a hot water heater 7. The water to be heated may flow continuously through the heater 7, as through an inlet 8 and an outlet 9. In the form shown, a thermostatic element 10 is inserted in the outlet 9 to monitor the temperature of heated water passing from the heater 7. The thermostatic element 10 may be connected to the diaphragm of a pilot valve 11 for controlling the operation of the main valve 5.

The main valve 5 is actuated in at least one direction and preferably in the opening direction by fluid-pressure-actuated means, which may be and preferably is of the type illustrated in my Patent No. 1,995,949, March 26, 1935, to which patent reference is hereby made for a disclosure of details of the valve 5. It will suffice to say here that the valve-actuating means includes a fluid-pressure-actuated member, such as a diaphragm, held between the hood 12 and the bonnet 13, as shown more particularly in my aforesaid patent. Upon an increase of pressure beneath the diaphragm, the main valve opens up and admits steam to heater 7. Opening of the main valve 5 in the present instance is controlled by fluid pressure admitted through connection 14 from the high pressure side of valve 7 through the pilot valve 11 to the pipe 15. The pipe 15 connects through a T-fitting with a bleed in line 16 to the low-pressure side of the valve and with a branch 17. Branch 17 is connected to the space beneath the valve diaphragm, preferably through a bleed connection 18.

The thermostat 10 controlling the pilot valve 11 may be of the type which employs a fluid to volatize upon a rise in temperature; the increased pressure transmitted through tubing 19 will act on a diaphragm of the pilot valve 11 more or less to close the pilot valve, so as to restrict flow of fluid to the underside of the diaphragm of the main valve 5 and thus to tend to close the main valve.

Now, if the pilot valve 11 should get out of order, for instance, if the pilot diaphragm should become ruptured or if the tubing 19 should break, the pilot valve 11 would move to open position so as to admit the maximum quantity of pressure fluid into the space beneath the diaphragm of the main valve 5 and the increased pressure in this space would hold the valve 5 wide open. Thus, the maximum supply of steam or other heating medium would be admitted to the heater and either cause damage thereto or so overheat the water or other fluid to be heated as to make it dangerous to use. I have devised a safety means for preventing the main valve 5 from admitting an excessive supply of steam, in case of failure of pilot valve 11 to control the main valve 5 normally.

In the form illustrated, my safety means comprises a safety pilot valve 20 which is designed to vent pressure fluid from beneath the main valve 5 in case, say, the outlet temperature from the heater rises above a predetermined desirable limit. The space beneath the diaphragm of main valve 5 may be connected, as by means of tubing 21, with the inlet side of the safety pilot valve 20. When the valve member 22 of the safety pilot 20 is seated, as illustrated in Fig. 1, the main valve 5 is controlled in a normal fashion by means of the normal thermostatic or other pilot valve 11.

However, when the valve member 22 is moved from its seat, pressure fluid from beneath the diaphragm of main valve 5 is vented through safety pilot 20, and the pressure fluid discharged through pipe 23 to the atmosphere or to some other zone of relatively low pressure.

The safety pilot 20 is controlled by thermostatic means which may be and preferably is positioned so as to be affected by the temperature in the outlet 9. The outlet 9 may employ a fitting such as the elbow 24, and a bushing 25 may be secured into the elbow. The bushing 25 may support and be normally secured to the open end of a tubular well 26, which may be brazed or otherwise secured in the counterbore 27 of the bushing 25. The well 26 may be for the purpose of protectively surrounding the thermostatic elements to be described.

A second bushing 29 may be screwed into the bushing 25, and the bushing 29 may carry or guide the thermostatic elements for actuating the safety pilot 20. In the form shown, a tubular thermostatic member 30 is brazed or otherwise secured to bushing 29, and a second thermostatic element 31 is connected, as by means of a cap or plug 32, to the inner end of the tube 30. The two thermostatic elements 30 and 31 may be formed of different metal or other materials having different coefficients of expansion, so that upon a change of temperatures there will be a movement of the left-hand end of the thermostatic element 31 relatively to the bushing 29.

The left-hand end of the thermostatic element 31 may be guided for relatively free movement in the guide portion 33 of bushing 29. Longitudinal movement of the left-hand end of the thermostatic element 31, which movement occurs upon a change of temperature, is utilized for actuating the safety pilot 20 when the temperature reaches the preselected safety limit.

The left-hand end of the thermostatic element 31 is preferably connected to a motion-multiplying linkage connected to an adjustable cam for adjustably actuating the safety pilot 20. In the form shown, the left-hand end of the thermostatic element 31 is connected by a link 34 to a crank 35, which is pivotally supported as at 36 in a bracket or other mounting device 37. The bushing 29 is also secured in the bracket 37, and it will be clear that changes in temperature in the outlet 9 may impart angular motion to the crank 35. The crank 35 preferably carries a cam plate 38 which includes a generally arcuate cam surface, arcuate about the pivotal axis 36 of crank 35. Cam-follower means 39 may be carried at one end of a rocker arm 40 pivotally supported by the bracket or frame 37, and the other end of rocker arm 40 may include an adjustable element 41 positioned for actuating engagement with a rod 42 carried by the safety pilot 20; the rod 42 in turn may engage the valve stem 43 for valve member 22. The nature of the cam surface on plate 38 is preferably such as to comprise two arcuate portions 44—45, each arcuate about the axis 36, with one (45) of greater radius than the other (44). Surfaces 44—45 may be joined by a sloping step or rise 46.

In accordance with the invention, the cam plate 38 may be angularly adjusted with respect to the crank 35 so as in effect to select the angular position of the sloping step 46. In the form shown, the cam plate 38 is formed as a generally sector-shaped piece journalled on the pivot pin 36 for crank 35 and including an arcuate slot 47 for adjustment purposes. An adjustment screw or other take-up means 49 may serve to clamp the cam plate 38 to the crank 35.

It will be appreciated that with a proper adjustment of the cam-follower means 39 and the actuating element 41, the cam-follower 39 may normally ride on the lower cam surface 44 for a full swing of the surface 44 (representing normal regulating temperatures of operation), without causing an opening of the venting valve member 22. If for some reason there is trouble with the operation of the normal temperature pilot 11, the increase in heating which would result will be immediately noted by the safety pilot, in that thermostatic element 31 will cause cam-follower 39 to ride upon the step 46. Valve member 22 will be immediately unseated so as to vent pressure fluid beneath the diaphragm of main valve 5. This venting action will occur for whatever the selected angular positioning of cam means 38. The selection of desired limiting or safety shut-off temperatures may be more readily effected by providing suitable graduations (as shown) on cam plate 38, to be read against, say, an arrow 50 on crank 35.

In certain applications it may be desirable that the safety pilot 20 be of the normally open variety, that is, a valve in which the valve member is normally urged in an open direction and wherein actuating forces must be continuously applied to its valve member in order to maintain such safety pilot closed. In such event, it will be clear that the arrangement of camming surfaces for determining the venting function will be slightly modified from the arrangement of Fig. 1. In Fig. 3, I show two such surfaces 51—52 joined by a sloping step 53, and the arrangement is such that the cam-follower means 39 normally rides on the surface 51 of greater radius. It will be clear that when the abnormal safety temperature limit is reached, cam-follower means 39 will descend on step 53, so as to allow an opening of the normally open type safety valve.

It will be seen that I have devised an improved simple means for regulating temperature in a heater or the like. The safety means is such as to assure that heater temperature may not rise above a predetermined safety limit; and, in the particular combination which has been described, this assurance holds even in the event of failure of or partial damage to the mechanism normally employed for temperature regulation.

While I have described my invention in detail for the preferred forms shown, it will be understood that modifications may be made within the scope of the invention as defined in the appended claim.

I claim:

In a device of the character indicated, a valve, two concentric elongated thermostatic members having different thermal coefficients of expansion and rigidly connected to each other at one end thereof, whereby both said members may be immersed in the same fluid and their relative elongation may reflect temperature changes in such fluid, a rigid connection between said valve body and the other end of one of said members, a crank pivoted to said connection and including a relatively short actuating arm connected to the other end of the other of said members, cam means on said crank at a relatively large radius about the pivotal axis thereof, whereby circumferential movement of said cam means may be relatively large for a small relative thermal elongation of said members, said cam means including a first surface arcuate about the pivot for said crank and of a first substantially constant radius and a second surface arcuate about the pivot for said crank and of a second substantially constant radius with a gradually sloping transitional step between said surfaces, adjustable securing means substantially arcuately adjustable about the pivot for said crank and for adjustably angularly securing one of said surfaces with respect to the other about the pivot for said crank, and cam-follower means riding said cam means and connected directly and positively to actuate said valve when said follower means is following said step.

PAULSEN SPENCE.

REFERENCES CITED

The following references are of record in the file of this patent:

UNITED STATES PATENTS

| Number | Name | Date |
|---|---|---|
| 396,215 | Lutcher | Jan. 15, 1889 |
| 682,526 | Brooke | Sept. 10, 1901 |
| 1,376,462 | Robertshaw | May 3, 1921 |
| 1,575,188 | Chace | Mar. 2, 1926 |
| 1,646,882 | Schwinn | Oct. 25, 1927 |
| 1,939,640 | Ainsworth | Dec. 19, 1933 |
| 2,161,679 | Kuenhold | June 6, 1939 |
| 2,210,922 | Joesting | Aug. 13, 1940 |
| 2,231,686 | Shaw | Feb. 11, 1941 |
| 2,234,388 | Scoggin | Mar. 11, 1941 |
| 2,271,651 | Kucera | Feb. 3, 1942 |
| 2,305,933 | Soderberg | Dec. 22, 1942 |